(12) United States Patent
Palutis

(10) Patent No.: US 12,221,361 B2
(45) Date of Patent: Feb. 11, 2025

(54) ENHANCED LEACHATE EVAPORATION WITH HEAT INDUCED ACCELERATION PROCESS

(71) Applicant: Custom Environmental Consulting LLC, Mckinney, TX (US)

(72) Inventor: Jeffrey R. Palutis, McKinney, TX (US)

(73) Assignee: Custom Environmental Consulting LLC, McKinney, TX (US)

( * ) Notice: Subject to any disclaimer, the term of this patent is extended or adjusted under 35 U.S.C. 154(b) by 0 days.

(21) Appl. No.: 18/407,874

(22) Filed: Jan. 9, 2024

(65) Prior Publication Data

US 2024/0140825 A1    May 2, 2024

Related U.S. Application Data

(63) Continuation of application No. 17/502,317, filed on Oct. 15, 2021, now Pat. No. 11,897,786.

(60) Provisional application No. 63/092,311, filed on Oct. 15, 2020, provisional application No. 63/092,303, filed on Oct. 15, 2020.

(51) Int. Cl.
| | |
|---|---|
| C02F 1/04 | (2023.01) |
| B09B 1/00 | (2006.01) |
| B09C 1/02 | (2006.01) |
| C02F 1/12 | (2023.01) |
| C02F 103/06 | (2006.01) |
| E02D 17/18 | (2006.01) |

(52) U.S. Cl.
CPC .............. *C02F 1/048* (2013.01); *B09B 1/004* (2013.01); *B09C 1/02* (2013.01); *C02F 1/12* (2013.01); *E02D 17/18* (2013.01); *B09C 2101/00* (2013.01); *C02F 2103/06* (2013.01)

(58) Field of Classification Search
None
See application file for complete search history.

(56) References Cited

U.S. PATENT DOCUMENTS

| | | | | |
|---|---|---|---|---|
| 289,785 | A * | 12/1883 | Stuart | B01D 1/14 159/16.1 |
| 1,233,119 | A * | 7/1917 | Parker | B05B 1/26 239/524 |
| 1,945,328 | A * | 1/1934 | Perkins | E21B 41/005 261/DIG. 75 |
| 2,344,839 | A * | 3/1944 | Warburton, Jr. | B01D 1/00 159/29 |
| 2,877,995 | A * | 3/1959 | Schleyer | F28C 1/00 261/103 |
| 3,235,877 | A * | 2/1966 | Grob | F28C 3/06 210/219 |

(Continued)

FOREIGN PATENT DOCUMENTS

CN    220334845 U  *  1/2024

*Primary Examiner* — Robert J Popovics
(74) *Attorney, Agent, or Firm* — Harper & Bates LLP; Scott L. Harper

(57) ABSTRACT

The invention disclosed herein includes apparatus and a method for enhancing the evaporation rate of leachate from leachate evaporator ponds. The HIAP apparatus and method promotes enhances evaporation by providing heat from high powered industrial heat lamps that direct heated air and heat energy across the air/leachate liquid interface of the evaporator pond surface to increase the evaporation rate of leachate from the evaporator pond.

9 Claims, 3 Drawing Sheets

(56) References Cited

U.S. PATENT DOCUMENTS

| | | | | |
|---|---|---|---|---|
| 3,622,074 A * | 11/1971 | Frohwerk | ............... | F28C 3/06 261/93 |
| 3,785,558 A * | 1/1974 | Albritton | ............... | F28C 3/06 261/36.1 |
| 3,838,816 A * | 10/1974 | Huff | ............... | B05B 17/08 239/18 |
| 3,869,087 A * | 3/1975 | Erickson | ............... | F28C 3/06 239/128 |
| 4,110,172 A * | 8/1978 | Spears, Jr. | ............... | C02F 1/14 261/153 |
| 4,169,791 A * | 10/1979 | Johnson, Jr. | ............... | C02F 3/24 159/901 |
| 4,267,022 A * | 5/1981 | Pitcher | ............... | C02F 1/16 202/205 |
| 4,428,842 A * | 1/1984 | House | ............... | E21B 41/005 210/750 |
| 4,440,148 A * | 4/1984 | Assaf | ............... | F24S 10/13 126/567 |
| 4,449,849 A * | 5/1984 | Horn | ............... | E21B 21/065 405/52 |
| 4,479,486 A * | 10/1984 | Manning | ............... | F28D 21/0012 126/714 |
| 4,498,300 A * | 2/1985 | Assaf | ............... | F24S 10/13 126/714 |
| 4,613,409 A * | 9/1986 | Volland | ............... | F24S 10/13 159/901 |
| 4,668,388 A * | 5/1987 | Dibble | ............... | C05F 17/90 210/612 |
| 4,693,304 A * | 9/1987 | Volland | ............... | B01D 1/228 159/26.1 |
| 4,704,189 A * | 11/1987 | Assaf | ............... | C01D 3/04 159/902 |
| 4,713,172 A * | 12/1987 | Horn | ............... | C02F 1/048 210/197 |
| 4,762,276 A * | 8/1988 | Foust | ............... | E21B 21/063 405/129.1 |
| 5,017,043 A * | 5/1991 | Assaf | ............... | B01D 21/245 405/74 |
| 5,043,076 A * | 8/1991 | Alexander | ............... | E02D 31/004 210/170.07 |
| 5,132,021 A * | 7/1992 | Alexander | ............... | E02D 31/004 210/283 |
| 5,155,356 A * | 10/1992 | Peters | ............... | G01M 3/005 250/392 |
| 5,330,017 A * | 7/1994 | Hart | ............... | E21B 21/065 175/212 |
| 5,342,482 A * | 8/1994 | Duesel, Jr. | ............... | B01D 1/14 405/128.85 |
| 5,509,996 A * | 4/1996 | Assaf | ............... | B05B 1/18 203/DIG. 17 |
| 5,601,688 A * | 2/1997 | Assaf | ............... | B01D 1/16 203/1 |
| 5,861,096 A * | 1/1999 | Mason | ............... | B01D 53/52 422/4 |
| 5,934,207 A * | 8/1999 | Echols | ............... | F23G 7/008 110/345 |
| 6,027,607 A * | 2/2000 | Corniel | ............... | C02F 1/04 159/901 |
| 6,190,566 B1 * | 2/2001 | Kolber | ............... | C02F 1/78 210/744 |
| 6,276,872 B1 * | 8/2001 | Schmitt | ............... | F28D 15/00 405/129.28 |
| 6,293,121 B1 * | 9/2001 | Labrador | ............... | F03D 5/00 62/304 |
| 6,367,278 B1 * | 4/2002 | Strussion | ............... | F24F 6/14 62/304 |
| 6,436,296 B1 * | 8/2002 | White | ............... | C02F 1/586 210/906 |
| 6,637,379 B2 * | 10/2003 | Hays | ............... | F22B 3/04 159/26.1 |
| 6,802,360 B1 * | 10/2004 | Schmitt | ............... | F28D 21/0012 165/45 |
| 6,814,866 B1 * | 11/2004 | Potts | ............... | B09C 1/002 210/612 |
| 7,448,600 B1 * | 11/2008 | Boulter | ............... | E21B 21/06 261/78.2 |
| 7,604,710 B2 * | 10/2009 | Haslem | ............... | B01D 1/20 405/224.1 |
| 7,722,739 B2 * | 5/2010 | Haslem | ............... | E21B 21/063 202/83 |
| 7,874,548 B1 * | 1/2011 | McGuffin | ............... | C02F 7/00 261/123 |
| 8,016,977 B2 * | 9/2011 | Rasmussen | ............... | B05B 1/202 159/901 |
| 8,122,878 B1 * | 2/2012 | Gross | ............... | F24S 23/77 126/714 |
| 8,256,748 B1 * | 9/2012 | Boulter | ............... | E21B 41/005 261/78.2 |
| 8,425,666 B2 * | 4/2013 | Batty | ............... | B01D 1/20 423/245.3 |
| 8,579,264 B1 * | 11/2013 | Fowles | ............... | C02F 1/048 261/78.2 |
| 8,585,869 B1 * | 11/2013 | Duesel, Jr. | ............... | C02F 1/048 203/79 |
| 8,623,174 B1 * | 1/2014 | Duesel, Jr. | ............... | B01D 1/0047 261/77 |
| 8,636,267 B1 * | 1/2014 | Boulter | ............... | B01D 1/0005 261/78.2 |
| 8,771,622 B2 * | 7/2014 | Hughes | ............... | C01D 7/10 423/179 |
| 8,808,497 B2 * | 8/2014 | Duesel, Jr. | ............... | C02F 1/10 159/32 |
| 8,920,608 B2 * | 12/2014 | Hammond | ............... | C02F 1/14 203/DIG. 1 |
| 8,926,791 B2 * | 1/2015 | Hammond | ............... | F26B 9/10 210/175 |
| 8,926,792 B1 * | 1/2015 | Houston | ............... | C02F 1/00 |
| 8,985,556 B2 * | 3/2015 | Boulter | ............... | C02F 1/048 261/78.2 |
| 9,115,003 B2 * | 8/2015 | Vandendoren | ............... | B01D 1/0058 |
| 9,199,861 B2 * | 12/2015 | Duesel, Jr. | ............... | B01D 1/14 |
| 9,440,862 B1 * | 9/2016 | Rahman | ............... | B01D 1/18 |
| 9,504,932 B2 * | 11/2016 | Noel | ............... | C02F 1/048 |
| 9,828,257 B2 * | 11/2017 | Noel | ............... | B01B 1/005 |
| 9,890,057 B2 * | 2/2018 | Houston | ............... | B05D 1/02 |
| 9,926,209 B2 * | 3/2018 | Houston | ............... | B05B 7/0075 |
| 9,943,774 B2 * | 4/2018 | Duesel, Jr. | ............... | B01D 1/14 |
| 9,969,626 B2 * | 5/2018 | Gawlik | ............... | B01D 1/0058 |
| 9,975,059 B2 * | 5/2018 | Carroll | ............... | C02F 1/048 |
| 10,150,677 B2 * | 12/2018 | Vandendoren | ............... | C01D 7/22 |
| 10,322,425 B2 * | 6/2019 | Bird | ............... | B05B 7/0075 |
| 10,486,120 B2 * | 11/2019 | Vlahogeorge | ............... | C02F 7/00 |
| 10,519,044 B2 * | 12/2019 | Noles, Jr. | ............... | B01F 23/23121 |
| 10,556,809 B2 * | 2/2020 | Patey | ............... | C02F 1/14 |
| 10,562,789 B2 * | 2/2020 | Patey | ............... | B01D 1/0047 |
| 10,562,790 B2 * | 2/2020 | Patey | ............... | B01D 1/305 |
| 10,570,026 B2 * | 2/2020 | Breeden | ............... | C02F 1/16 |
| RE48,078 E * | 7/2020 | Carroll | ............... | B01D 1/16 |
| 10,787,372 B1 * | 9/2020 | Blanchard | ............... | B01D 1/2896 |
| 10,850,992 B2 * | 12/2020 | Steyl | ............... | C02F 1/048 |
| 10,907,461 B1 * | 2/2021 | Sherry | ............... | E21B 43/34 |
| 11,220,439 B2 * | 1/2022 | Lee | ............... | C02F 1/10 |
| 11,286,762 B1 * | 3/2022 | Sherry | ............... | B01D 1/30 |
| 11,376,520 B2 * | 7/2022 | Duesel, Jr. | ............... | B01D 1/305 |
| 11,465,917 B2 * | 10/2022 | Patey | ............... | F28D 1/0366 |
| 11,642,633 B2 * | 5/2023 | Titus | ............... | B01F 23/231232 210/150 |
| 11,746,276 B2 * | 9/2023 | Alsahlawi | ............... | B01F 35/2136 366/136 |
| 11,897,786 B2 * | 2/2024 | Palutis | ............... | E02D 17/18 |
| 2001/0013497 A1 * | 8/2001 | Kolber | ............... | C02F 1/78 210/170.08 |
| 2005/0067151 A1 * | 3/2005 | Miller | ............... | C02F 1/16 165/108 |
| 2008/0131830 A1 * | 6/2008 | Nix | ............... | F24S 10/45 432/220 |
| 2010/0176064 A1 * | 7/2010 | Batty | ............... | B01D 5/0039 210/151 |

(56) References Cited

U.S. PATENT DOCUMENTS

| | | | | |
|---|---|---|---|---|
| 2011/0140457 A1* | 6/2011 | Lakatos | ............... | B03D 1/1462 210/639 |
| 2011/0168646 A1* | 7/2011 | Tafoya | ............... | C02F 1/12 210/180 |
| 2011/0274599 A1* | 11/2011 | Hughes | ............... | C01D 7/12 423/208 |
| 2011/0303367 A1* | 12/2011 | Panz | ............... | C02F 1/048 159/16.2 |
| 2011/0315542 A1* | 12/2011 | Ba-Abbad | ............... | F24S 20/20 204/158.21 |
| 2012/0216963 A1* | 8/2012 | Tafoya | ............... | B01D 1/14 159/4.01 |
| 2013/0233697 A1* | 9/2013 | Bryant | ............... | B01D 5/006 203/10 |
| 2013/0248122 A1* | 9/2013 | Duesel, Jr. | ............... | B01D 1/30 159/47.1 |
| 2014/0102645 A1* | 4/2014 | Abahusayn | ............... | C01D 3/06 159/3 |
| 2014/0166211 A1* | 6/2014 | Duesel, Jr. | ............... | C02F 1/10 159/47.3 |
| 2014/0174673 A1* | 6/2014 | Vandendoren | ............... | E21B 43/28 166/305.1 |
| 2014/0178288 A1* | 6/2014 | Vandendoren | ............... | C01D 7/24 159/32 |
| 2014/0202222 A1* | 7/2014 | Hammond | ............... | F26B 9/06 71/12 |
| 2014/0216033 A1* | 8/2014 | Duesel, Jr. | ............... | C02F 1/048 159/47.1 |
| 2015/0353378 A1* | 12/2015 | Gawlik | ............... | C02F 1/14 159/47.3 |
| 2016/0051999 A1* | 2/2016 | Duhaime | ............... | B05B 7/0093 239/722 |
| 2016/0194216 A1* | 7/2016 | Houston | ............... | B05B 7/32 159/47.3 |
| 2016/0229706 A1* | 8/2016 | Ackerman | ............... | C02F 1/16 |
| 2016/0304357 A1* | 10/2016 | Houston | ............... | C02F 1/74 |
| 2016/0325202 A1* | 11/2016 | Phillips | ............... | C02F 1/048 |
| 2017/0190596 A1* | 7/2017 | Breeden | ............... | C02F 1/20 |
| 2017/0259283 A1* | 9/2017 | Bird | ............... | B05B 7/061 |
| 2018/0186658 A1* | 7/2018 | Noles, Jr. | ............... | B01D 1/14 |
| 2018/0186659 A1* | 7/2018 | Noles, Jr. | ............... | B01D 3/346 |
| 2018/0334393 A1* | 11/2018 | Patey | ............... | C02F 1/12 |
| 2018/0345165 A1* | 12/2018 | Patey | ............... | B01D 1/221 |
| 2018/0345166 A1* | 12/2018 | Patey | ............... | F28F 3/08 |
| 2019/0314735 A1* | 10/2019 | Ballantyne | ............... | C02F 1/14 |
| 2020/0123022 A1* | 4/2020 | Steyl | ............... | C02F 1/048 |
| 2020/0277202 A1* | 9/2020 | Patey | ............... | B01D 1/305 |
| 2021/0017044 A1* | 1/2021 | Lolling | ............... | C02F 1/048 |
| 2021/0046397 A1* | 2/2021 | Ballantyne | ............... | B01B 1/005 |
| 2021/0115939 A1* | 4/2021 | MacDonald | ............... | B01F 23/2132 |
| 2021/0387867 A1* | 12/2021 | Lolling | ............... | C02F 1/08 |
| 2021/0395110 A1* | 12/2021 | Warner | ............... | C02F 1/10 |
| 2022/0096953 A1* | 3/2022 | Bell | ............... | C02F 1/14 |
| 2022/0118491 A1* | 4/2022 | Palutis | ............... | B09B 1/004 |
| 2022/0119277 A1* | 4/2022 | Palutis | ............... | C02F 1/12 |
| 2022/0306495 A1* | 9/2022 | Soliman | ............... | C02F 1/445 |
| 2023/0150837 A1* | 5/2023 | Reitze | ............... | C02F 1/043 159/47.3 |
| 2024/0140825 A1* | 5/2024 | Palutis | ............... | C02F 1/048 |

\* cited by examiner

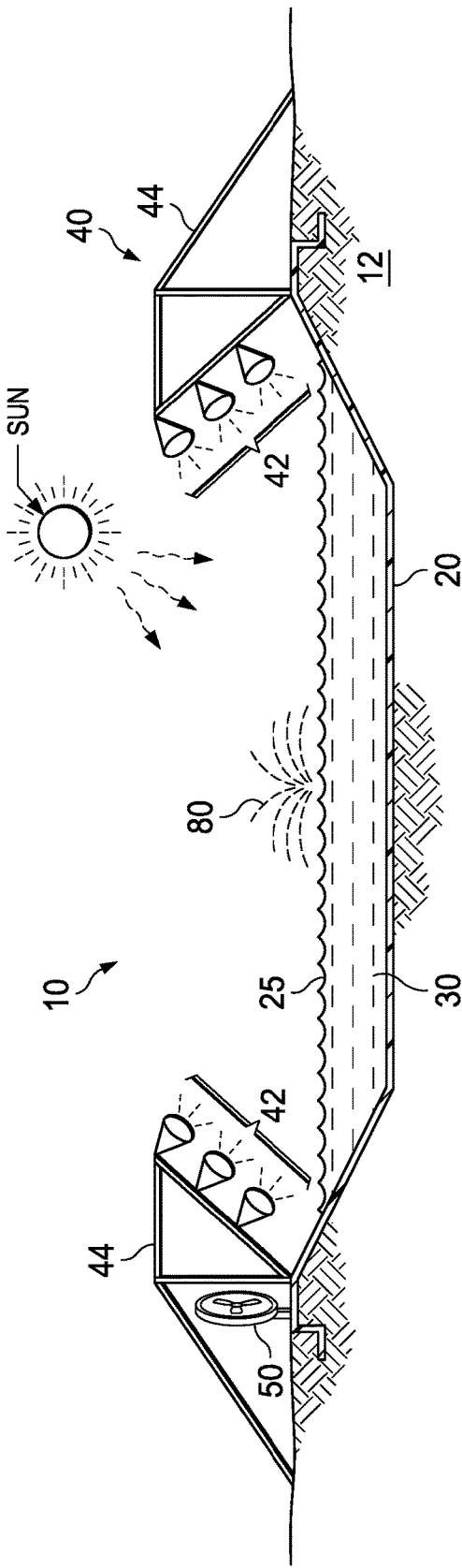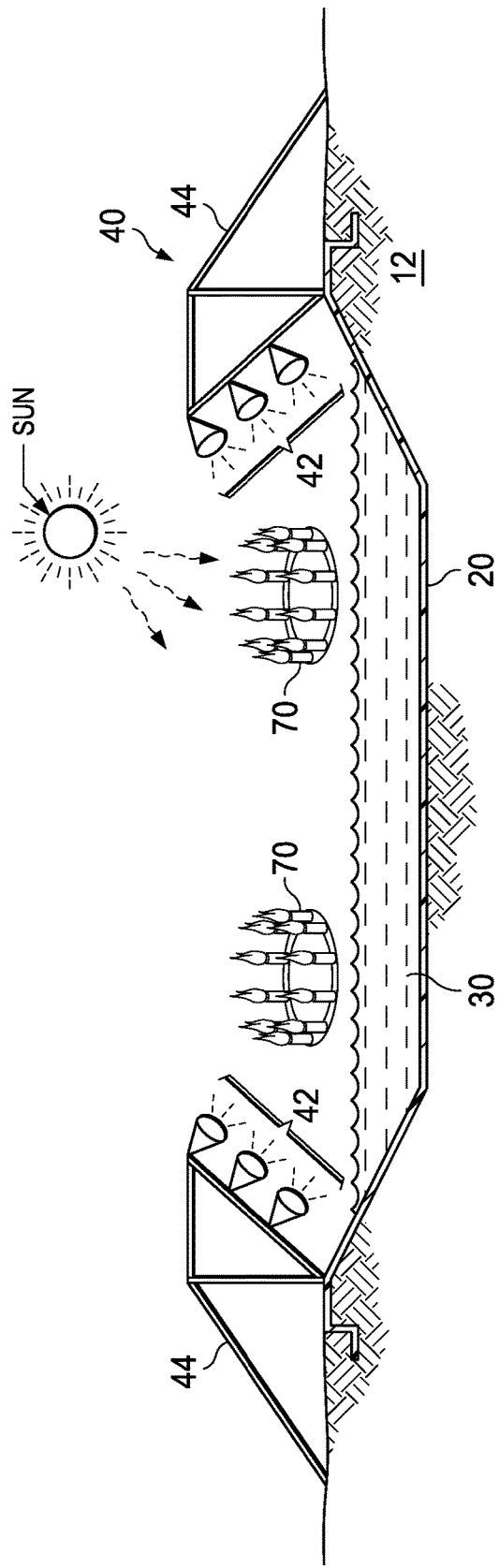

ENHANCED LEACHATE EVAPORATION WITH HEAT INDUCED ACCELERATION PROCESS

CROSS-REFERENCE TO RELATED APPLICATIONS

The application claims the benefit of U.S. Non-Provisional patent application Ser. No. 17/502,317 filed Oct. 15, 2021, entitled "Enhanced Leachate Evaporation With Heat Induced Acceleration Process," which claims priority to and the benefit of U.S. Provisional Patent Application Ser. No. 63/092,311 filed Oct. 15, 2020, entitled "Enhanced Leachate Evaporation Heat Induced Acceleration Process," and also claims the benefit of U.S. Provisional Patent Application Ser. No. 63/092,303 filed Oct. 15, 2020, entitled "Apparatus And Method For Ballast Leachate Evaporation For Exposed Landfill Covers," which are incorporated herein by reference in its entirety.

BACKGROUND

The current handling of leachate and treatment of contaminated liquids are proving to be inadequate. Recent environmental concerns of handling leachate producing increasing amounts of perfluoroalkyls and polyfluoroalkyls substances (PFAS), foam, odor, and other contaminates have resulted in wastewater treatment plants (WWTP) refusing and rejecting further treatment of leachate. PFAS are man-made carbon fluorine chemicals widely used in numerous industrial and household products. PFAS is being detected in numerous wastewaters, especially landfill leachate, due to their distributed use in industrial and consumer products. This chemical is highly dangerous to human health and the environment, making off-site treatment a potential liability to the municipal solid waste disposal industry publicly owned treatment works (POTW).

As the environmental industry searches for solutions to this ongoing issue, environmental concerns are mounting as the uncertainty for handling and treating leachate safely and cost effectively while maintaining in compliance with operations. The following issues are currently being observed in the wastewater and leachate treatment industry: (1) increased cost for leachate treatment due to complexity of leachate contaminants; (2) increased leachate volumes while reducing leachate recirculation at landfills due to increased landfill stability concerns and odors; (3) increased leachate volumes at landfill facilities from expanding waste disposal footprints to handle the ongoing and increased waste disposal volumes; (4) regulatory uncertainty for both landfill owners and treatment facilities; (5) changing waste streams now with large measured PFAS and other contaminates impacting quality of liquid end produce after treatment; and (6) concerns with handling landfill leachate with changing characteristics such as: color, increasing amounts of foam, odors, amounts of ammonia, metals, and other various amounts of emerging contaminants. Moreover, according to annual reporting all major waste disposal companies are showing increased leachate treatment volumes and costs. As more and more WWTP's are rejecting leachate treatment, this is creating high costs to landfill owners and generating off-site treatment limitations. Additionally, current leachate evaporator pond designs and functions are inadequate and have various inherent limitations.

The invention disclosed herein provides novel solutions to the foregoing issues that are economical, operationally friendly, effective, and meet state and/or federal rules while managing the contaminated liquid on-site. Managing the treatment of liquids onsite will be most appealing to waste site and landfill owners and operators, provide better cost controls, and remove third party handling that could create unforeseen environmental liabilities. In the past, leachate Evaporator Ponds have exclusively relied on natural evaporation processes resulting from exposure to solar (sun) radiation and wind. Current pond designs have many limitations restricting evaporation due to changing weather (e.g., cool and damp days, rain, cloudy), seasonal weather changes, nighttime and geography (higher and lower elevation affects natural evaporation rates). Evaporator Ponds are only used in drier climate limiting the use from most of the nation. These limitations create an environmental need for a more efficient and long-term solution. The Heat Induced Acceleration Process (HIAP) disclosed herein provides a long-term solution and avoids the limitations from the previous leachate evaporation treatment processes.

SUMMARY OF INVENTION

The invention disclosed herein includes apparatus and a method for enhancing the evaporation rate of leachate from leachate evaporator ponds. Leachate evaporator ponds have been used at landfill facilities and industries handling contaminated liquids throughout the United States. Primarily, leachate evaporators show the most success in arid and semi-arid areas where the evaporation percentage is much greater than the annual rain fall amounts. The HIAP apparatus and method promotes enhances evaporation by providing heat from high powered industrial heat lamps that direct heated air and heat energy across the air/leachate liquid interface of the evaporator pond surface to increase the evaporation rate of leachate from the evaporator pond. The invention disclosed herein may be operated on a continuous or semi-continuous basis over the course of 24 hours to accelerate and maintain increased evaporation rates over and above naturally occurring/existing evaporation rates. The HIAP apparatus and method allow landfill facilities outside of arid and dry areas to rapidly evaporate leachate and reduce the volume of leachate that would need to be transported by third party transportation services, reducing the transportation and handling expenses and liabilities associated with physical removal of leachate from an evaporator pond more quickly. HIAP systems can be installed at significantly less cost than the high transportation and rising costs associated with treatment of leachate at advanced wastewater treatment plants capable of processing leachate.

The HIAP process disclosed herein includes combining natural solar evaporation with additional heat inputs from high powered industrial heat lamps and/or heat from the flare of landfill gas or from a flame source connected to a fuel supply. Embodiments of the invention may use the HIAP process to provide accelerated evaporation rates even during days when natural evaporation from the sun is limited such as cloudy days, low cool ambient temperature, and during the night. The inventive embodiments disclosed herein enhance the rate and efficiency of contaminated liquid evaporation by the addition of enhanced heat from heat sources, such as heat lamps, industrial high strength lights, hot air captured from landfill gas flare operations, or flame/flare fueled from landfill gas or natural gas. High flow rate air fans can also be utilized to increase leachate evaporation rates to complement the accelerated evaporation provided by the HIAP method. In areas prone to rain and/or snow conditions, temporary or permanent roofs with optional suspended heat lamps may be utilized to promote the goals of the invention disclosed herein.

As previously described, embodiments of the disclosed invention provide a novel and effective process for evaporating contaminated liquids not only in arid and dry conditions of the country, but throughout the nation where evaporation was historically low or even unachievable. The HIAP method comprises heat lamps, industrial strength lamps, hot air from gas flare operations, flames fuels from landfill gas or natural gas, or other heat sources to raise the temperature around the evaporation pond and over the liquid pond surface-air interface to enhance and accelerate evaporation of leachate from the pond. The disclosed inventive method and apparatus increases the volume of liquid evaporated and limits or avoids the need for off-site treatment. The HIAP method and apparatus may use heat generated from lamps, captured hot air from landfill gas flare operations, convert landfill gas to flame burners, use natural gas as a burner fuel supply for flame heat generation, or any combination thereof to enhance and accelerate evaporation.

Additional benefits of the HIAP method also include owners and operators can reduce greenhouse gas (GHG) emissions, document for a more sustainable company, and apply for beneficial reuse tax credits. In an embodiment, any portion of the enhanced lighting and heating requiring electric power can be supplied from converting landfill gas to electricity or the use of solar power for energy. The estimated emission reductions could be calculated using the estimated kWh of electricity that would be used for the evaporator heating process. Using landfill gas to heat the flame heat blowers during leachate evaporation processes would also provide emission reductions. The estimated emission reductions could be calculated using the total MMBtu from the flare burners while assuming natural gas was used as a replacement fuel.

The details of one or more inventive embodiments are set forth in the drawings included in this application and which are further described below. Other features, objects, and advantages of the inventive embodiments disclosed herein will be apparent from this description and figures.

BRIEF DESCRIPTION OF THE DRAWINGS

For a more complete understanding of this disclosure and its features, reference is now made to the following description, taken in conjunction with the accompanying drawings, in which:

FIG. 1 illustrates a cross-sectional view of a leachate pond or engineered impoundment with an embodiment of the HIAP apparatus and method according to the present disclosure;

FIG. 2 illustrates a cross-sectional view of a leachate pond or engineered impoundment with an embodiment of the HIAP apparatus and method with flame burners according to the present disclosure;

DETAILED DESCRIPTION

Figure 3:
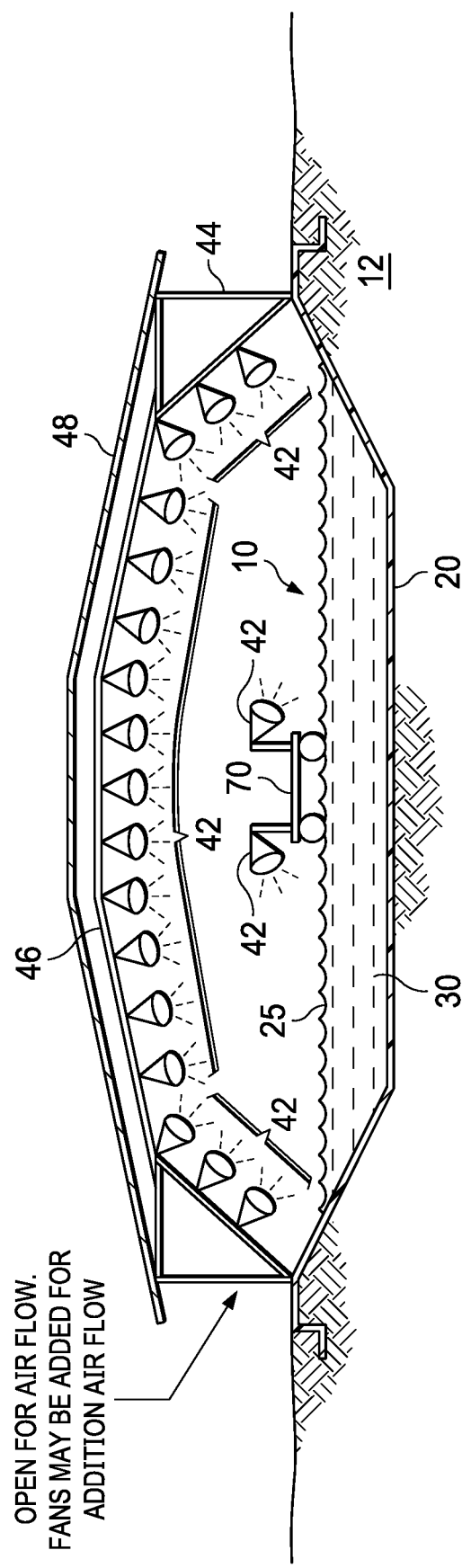
FIG. 3 is a cross-sectional view of a leachate pond or engineered impoundment that includes a permanent or temporary roof or covering structure with an embodiment of the HIAP apparatus and method according to the present disclosure; and, FIGS. 4A and 4B are cross-sectional views of leachate ponds, trenches or engineered impoundments which are open, partially open or enclosed with a permanent or temporary roof or covering structure with an embodiment of the HIAP apparatus and method according to the present disclosure.

FIG. 1 depicts a cross-section view of leachate pond 10 formed on top of a soil parcel or fill material 12. A liner 20 acts to prevent the infiltration of leachate 30 into fill 12 and acts to retain leachate 30 in leachate pond 10. One or more heat units 40 which include one or more heat sources attached to one or more frames 44 are arranged around and/or above the surface of pond 10. In various embodiments, heat source 42 may comprise a hot air, gas or electric heat lamp, a flame burner assembly, or other apparatus capable of generating heat energy as is known in the art. One or more heat sources 42 are attached to one or more frames 44 and placed in relative proximity to the pond 10 air-leachate interface surface 25 to enhance the direction and application of heat and heat energy across the air-leachate interface surface 25 of pond 10 to accelerate or otherwise enhance the evaporation rate of leachate 30 contained in pond 10. One or more high flow circulation fans 50 may be attached to one or more frames 44 and positioned to aid in the circulation of heated air and heat energy across the air-leachate interface surface 25 of pond 10 to further distribute, accelerate and/or enhance the evaporation rate of leachate 30 contained in pond 10. Heat source 42 may comprise solar, gas or electrically powered heat lamps in an embodiment. Heat source 42 may be secured to frame 44 or place on floats or located within the pond 10 to provide distributed heating and heat energy across the air-leachate surface 25 of pond 10. In an embodiment, a leachate mister 80 is located in pond 10 whereby leachate 30 is misted into vapor droplets projected into the air atmosphere to further distribute, accelerate and/or enhance the evaporation of leachate 30 from pond 10.

Turning to FIG. 2, an embodiment of the present invention is shown with heat sources comprising heat sources and flame/burner heat sources 70 used in combination to accelerate and/or enhance the evaporation rate of leachate 30 contained in pond 10. In an embodiment, leachate pond 10 is formed on top of a soil parcel or fill material 12. A liner 20 acts to prevent the infiltration of leachate 30 into fill 12 and acts to retain leachate 30 in leachate pond 10. Heat sources 42 may comprise solar, gas or electrically powered heat lamps in an embodiment. Heat sources 42 may be secured to frame 44 or placed on floats or located within the pond 10 to provide distributed heating and heat energy across the air-leachate surface 25 of pond 10. Flame/burner heat sources 70 may be placed on floats in pond 10 or fixed in desired positions in pond 10 as appropriate or otherwise designed. The heat lamps, industrial strength lamps or other high-powered heat generation lamps may be field fitted around the perimeter of the previously installed evaporation pond. Fuel sources for the flame/burner heat sources 70 may comprise landfill gas, a connected gas pipeline or other appropriate fuel source for igniting and sustaining a flame. Piped hot air captured from on-site landfill gas flare operations can be added and used with-in the leachate (30) to air-flow and heat leachate or placed above the leachate pond surface 10 similar to flame/burner 70.

FIG. 3 illustrates an embodiment of the present invention which includes a permanent or temporary covering or roof 48 for further accelerating or enhancing evaporation of leachate 30 from pond 10. In the depicted embodiment, truss member 46 is attached to one or more frames 44 to provide structural support for a permanent or temporary covering or roof 48. One or more heat sources 42 may be attached to one or more frames 44 and Beams for roof support will allow open air to flow and move over the pond surface and additional high flow rate air fans may be utilized to increase air flow across the pond surface resulting in increased evaporation. Heat Lamps can be powered by electric, solar power, or converted electric form on-site landfill gas-to-energy projects.

Figure 4A:
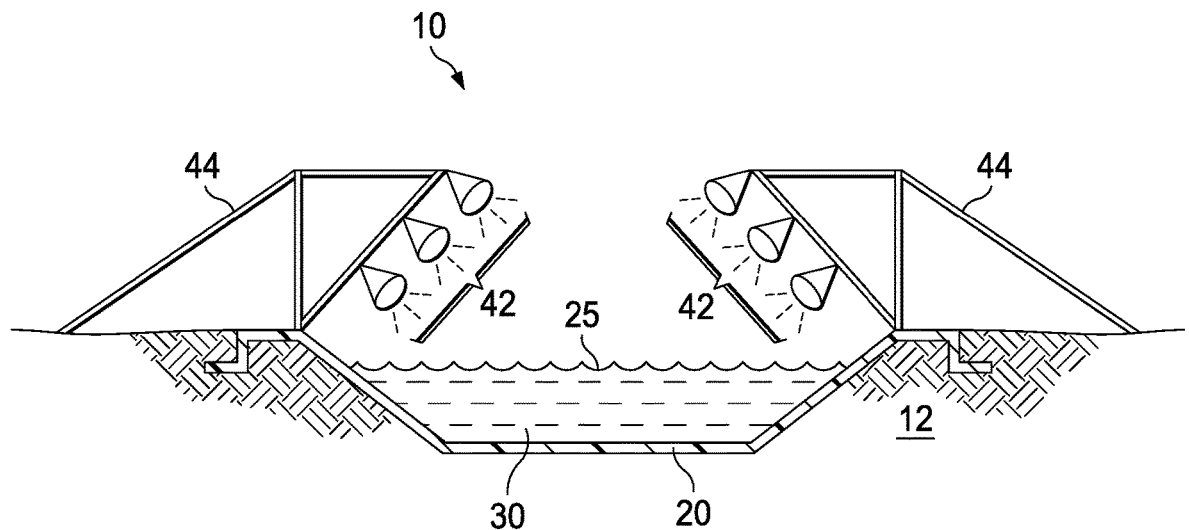
Figure 4B:
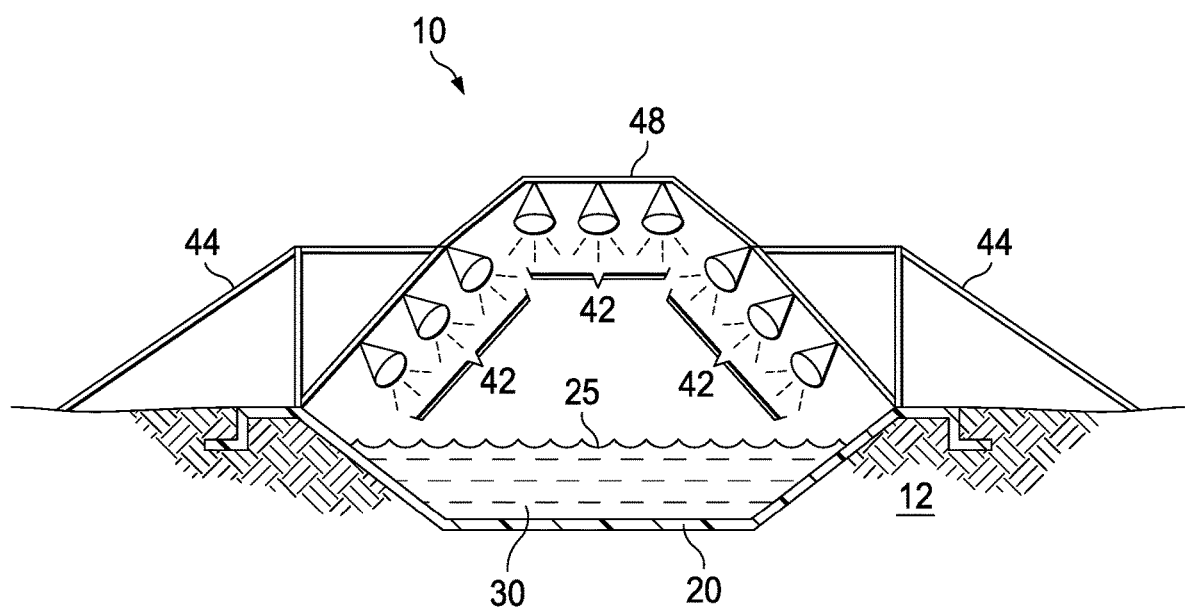

FIG. 4A depicts a cross-section design for the leachate evaporation ponds 10 as one or more trenches cut into fill 12 with an impoundment liner 20 for containing leachate 30 to increase enhanced heat over a smaller surface area the air-leachate surface 25 of the pond 10 and apply a larger amount of heat at the center of the leachate pond 10. In the depicted embodiment, heat sources 42 are attached to frames 44 and provide distributed heating and heat energy across the air-leachate surface 25 of pond 10. As shown in FIG. 4B, heat sources 42 may be suspended frames 44 and from a permanent or temporary roof covering 48 to provide distributed heating and heat energy across the air-leachate surface 25 of pond 10 can be utilized with any embodiment of the method disclosed herein. Any combinations of heat sources identified in this invention may be used together or separately to enhance the evaporation of leachate in any or all leachate evaporation ponds or trenches.

For any of the embodiments disclosed in this application, modifications to incorporate alternative concepts shown in one or more of the figures may be used. For example, floating, suspended, or fixed heat lamps, high flow air fans and enhanced heat lamps can be used in the design and operation of the HIAP embodiments contemplated herein. Alternatively, it is contemplated that the methods and apparatus disclosed herein may also be used in connection with known wastewater leachate treatment technologies and incorporate aerators, oxygen injection systems, clarifiers and other known methods and apparatus for wastewater and leachate treatment and evaporative enhancement.

Utilization of the HIAP method and apparatus will provide landfill and other waste site owners the ability to off-set significant third-party treatment costs. Owners and operators will now be able to fully control and remediate contaminated wastewater, avoiding third party liabilities contingent with the lack of oversight associated with uncontrolled off-site contamination. Advantages of HIAP include: (i) owner controls all contaminated liquid on site in order to avoid potential third-party liabilities, and Remedial Actions of Potential Responsible Parties (PRP); (ii) reduce overall operational costs and increasing EBITDA earnings; (iii) eliminates uncertain cost increases from third party transportation, and third-party treatment; (iv) reduces future liabilities associated with 30-year post landfill closure requirements; (v) allows treatment in existing leachate evaporation ponds and avoids constructing additional infrastructure for leachate management and treatment; (vi) reduces greenhouse gas (GHG) emissions in order to help meet owner's goals for annual Global Reporting Initiative (GM); (vii) energy to supply high powered industrial lamps can be obtained from the on-site beneficial reuse project of converting landfill gas to energy or fuel source for HIAP lamps or flare/torch/burner apparatus; (viii) additional reduction of greenhouse gas emissions can be achieved through solar power intended for the use of high-powered industrial strength lamps; (ix) additional beneficial reuse from heat induced flair burners being fueled from diverting and use of on-site landfill gas; (x) reduction in direct scope 1 (GHG) emissions reduces owners greenhouse gas calculated intensity, and shareholder initiatives to reduce MT CO2e/$ Gross Revenue; (xi) limits the fluctuation of uncontrolled third-party cost increases; and, (xii) removes the fear of wastewater treatment plants cancelling treatment disposal contracts, leaving the owner helpless with no leachate treatment alternatives, and avoids potential state regulatory violations.

The HIAP apparatus and method creates a more productive treatment process than current technologies in view of: (i) down-time, maintenance, and permitting challenges with Thermal Evaporators, Reverse Osmosis (RO) and Deep Well Injections, and (ii) four to ten times more evaporation than typical evaporation ponds or spraying/aeration systems and allows 24 hours per day evaporation in various weather conditions (light rain, and cold/cloudy days) and overnight. Once the HIAP system is installed it can be operated and maintained with on-site landfill staff resulting with no or very limited third-party contractors. Operational costs remain low and consistent limiting unnecessary and unknown budget concerns. Enhanced systems can be designed as mobile units and transported to and placed in constructed landfill cells where large amounts of leachate were produced. The HIAP systems can be used with evaporation misting/aeration systems to further accelerate evaporation. The HIAP method and apparatus can also be used to manage liquids produced from oil and gas exploration and production (E&P) waste facilities.

Although the present disclosure has been described in detail, various changes, substitutions, and alterations may be made herein without departing from the spirit and scope of the disclosure as defined by the appended claims. Moreover, the scope of the present application is not intended to be limited to the embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure

I claim:
1. A leachate treatment system comprising:
   a leachate pond containing a leachate;
   a frame arranged around and/or above the surface of the leachate pond; and
   at least one heat lamp secured to the frame and positioned close enough to the surface air-leachate interface surface such that the application of heat energy from the heat lamp across the air-leachate interface surface of the leachate pond accelerates the evaporation rate of the leachate contained in the leachate pond.
2. The system of claim 1 wherein the system further comprising:
   a light source, or a flame burner as a source of heat capable of accelerating the evaporation rate.
3. The system of claim 1 further comprising:
   a circulation fan for circulating heat energy across the air-leachate interface surface to accelerate the evaporation rate of the leachate contained within the leachate pond.
4. The system of claim 1 further comprising:
   a leachate mister for misting leachate droplets into the air to accelerate the evaporation rate of the leachate contained within the leachate pond.
5. The system of claim 1 further comprising:
   a floating frame capable of supporting at least one heat source in fixed position above the surface of the leachate contained in the leachate pond.

6. The system of claim 1 further comprising:
heated air captured from a landfill gas flare and delivered to the surface or within the leachate contained in the leachate pond to accelerate evaporation.

7. The system of claim 1 wherein the heat lamp is powered by electricity originating from landfill gas or solar power.

8. The system of claim 1 further comprising:
a roof secured to the frame and suspended above the leachate pond.

9. The system of claim 8 wherein the roof includes a retractable portion.

* * * * *